United States Patent
Rodriguez et al.

(10) Patent No.: US 11,391,335 B2
(45) Date of Patent: Jul. 19, 2022

(54) BRAKING BAND OF A DISC FOR DISC BRAKE

(71) Applicant: FRENI BREMBO S.P.A., Curno (IT)

(72) Inventors: Facundo Hèctor Rodriguez, Curno (IT); Massimiliano Maroni, Curno (IT); Giuseppe Carletti, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 52 days.

(21) Appl. No.: 16/758,910

(22) PCT Filed: Oct. 18, 2018

(86) PCT No.: PCT/IB2018/058085
§ 371 (c)(1),
(2) Date: Apr. 24, 2020

(87) PCT Pub. No.: WO2019/082027
PCT Pub. Date: May 2, 2019

(65) Prior Publication Data
US 2020/0370613 A1   Nov. 26, 2020

(30) Foreign Application Priority Data

Oct. 24, 2017   (IT) .................. 102017000120731

(51) Int. Cl.
| | |
|---|---|
| *F16D 65/12* | (2006.01) |
| *F16D 65/847* | (2006.01) |
| *F16D 65/02* | (2006.01) |

(52) U.S. Cl.
CPC ......... *F16D 65/128* (2013.01); *F16D 65/123* (2013.01); *F16D 65/847* (2013.01);
(Continued)

(58) Field of Classification Search
CPC .................. F16D 65/12; F16D 65/123–128
(Continued)

(56) References Cited

U.S. PATENT DOCUMENTS

| | | | |
|---|---|---|---|
| 2,345,016 A | | 3/1944 | Tack |
| 2,345,017 A | * | 3/1944 | Tack ............... F16D 65/128 |
| | | | 188/264 A |

(Continued)

FOREIGN PATENT DOCUMENTS

| | | |
|---|---|---|
| DE | 102004056645 A1 | 6/2006 |
| EP | 2459896 B1 | 8/2013 |

(Continued)

OTHER PUBLICATIONS

European Patent Office, International Search Report with Written Opinion, dated Jan. 11, 2019, 10 pages, European Patent Office, Rijswijk, Netherlands.

*Primary Examiner* — Christopher P Schwartz
(74) *Attorney, Agent, or Firm* — Marshall & Melhorn, LLC (57) ABSTRACT

A braking band of a disc for disc brake includes a first plate and a second plate, arranged facing each other so as to form a gap, a plurality of connecting elements and/or spacers having a plurality of connecting fins, each extending between a radially inner peripheral portion and a radially outer peripheral portion of the braking band along a longitudinal fin direction, coinciding with the longitudinal development axis of the connecting fin. Some connecting fins extend along a longitudinal fin direction and comprise an arched stretch having a concavity kept in the same sense along the entire longitudinal extension of the arched stretch, defining ventilation channels. The first plate inner surface has a plurality of first plate protrusions projecting into the gap from the first plate inner surface towards the second plate. The second plate inner surface has a plurality of second plate protrusions projecting into the gap from the second plate inner surface towards the first plate.

18 Claims, 7 Drawing Sheets

(52) U.S. Cl.
CPC ............... *F16D 2065/1316* (2013.01); *F16D 2065/1328* (2013.01); *F16D 2065/1392* (2013.01)

(58) Field of Classification Search
USPC ..................... 188/218 XL, 264 A, 264 AA
See application file for complete search history.

(56) References Cited

U.S. PATENT DOCUMENTS

| | | | | |
|---|---|---|---|---|
| 2,380,085 | A | * | 7/1945 | Tack .................. F16D 65/128 188/218 XL |
| 8,511,443 | B2 | | 8/2013 | Veneziano et al. |
| 9,206,868 | B2 | * | 12/2015 | Veneziano ............ F16D 65/128 |
| 2009/0057077 | A1 | * | 3/2009 | Mears .................. F16D 65/128 188/218 XL |

FOREIGN PATENT DOCUMENTS

| | | |
|---|---|---|
| EP | 2647864 B1 | 12/2015 |
| WO | WO2007/010569 A1 | 1/2007 |
| WO | WO2017153902 A1 | 9/2017 |

\* cited by examiner

BRAKING BAND OF A DISC FOR DISC BRAKE

FIELD OF THE INVENTION

The present invention relates to a braking band for a disc of a disc brake.

In particular, the present invention relates to a braking band of the ventilated type.

The present invention further relates to a disc of a disc brake.

BACKGROUND ART

In a disc brake, the brake caliper is generally arranged straddling the outer peripheral margin of a brake disc, adapted to rotate about a rotation axis defining an axial direction. In a disc brake, a radial direction (R-R), arranged substantially orthogonal to said axial direction (X-X), and a tangential or circumferential direction (C-C), orthogonal to both said axial direction (X-X) and said radial direction (R-R), is further defined. Known brake discs oppose two opposite braking surfaces facing the friction material of the opposite brake pads provided on the caliper body placed straddling the disc.

The brake pads, appropriately actuated, by closing against the opposite braking surfaces of the disc, apply a considerable friction adapted to create the desired braking torque which concurrently transforms the motion energy of the vehicle into heat, which accumulates in the body of the braking band of the disc brake and in the brake pads themselves. Indeed, this heat extends from the braking surfaces of the disc to the braking band and to the entire body of the brake disc, whereby heating, and sometimes overheating, the body of the caliper which is straddling the disc. In particular, in applications on high-performance vehicles and/or vehicles with high braking efficiency, the energies to be disposed of are extremely large.

Brake discs of ventilated type are generally known, i.e. discs comprising a braking band having two opposite and mutually facing plates on which opposite braking surfaces are made, adapted to cooperate with opposing brake pads of a brake caliper placed straddling the disc to apply the braking action.

Usually, said two plates are distanced in axial direction whereby delimiting a hollow space and provide a plurality of axial connecting elements, such as fins or pins, which structurally connect said two plates to each other, thus forming a gap together with the two plates.

Known ventilated disc solutions have continuously evolved, in particular as regards the number and conformation of the so-called ventilation channels within said gap.

A need is strongly felt to cool the rotating disc brake quickly and effectively.

In particular, in order to maximize the heat extracted from the disc, it is important for the air current to flow inside the gap in turbulent conditions, while ensuring load losses which are as small as possible so as not to slow down the rotation of the disc itself in driving conditions and to maximize the flow rate of the cooling flow, which overheats and exits from the radially outer edge of the braking band of the rotating disc brake.

It is known that excessively high brake disc temperatures decrease braking action efficiency and may cause the deformation of the braking band, the formation of cracks on braking surfaces and transformations of localized status of the material forming the braking band, which in turn causes its premature deterioration.

Such a need to increase the cooling efficiency must in all cases be mediated with the further need to keep the overall dimensions unchanged, particularly in the axial direction of the discs to avoid modifications of the vehicle suspension for which they are intended. The contrasting need to lighten the brake discs is also felt, because being unsprung masses, their weight is directly proportional to the inertia of the rotating disc during braking.

The geometry of the ventilation channels defined in circumferential direction by the arrangement and shape of the connecting fins or pins is of primary importance for the cooling performance of the braking band of the disc brake. In a typical arrangement of the connecting fins between the plates of the braking band, they constitute modular units which are repeated mutually side-by-side in order to make cooling features as uniform as possible on the entire body of the disc, as shown for example in documents EP-2459896 and EP-2647864 to the Applicant.

These documents show modular units made of a radially inner range and a radially outer range of fins having tapered shape. The fins of the radially outer range, being circumferentially offset with respect to the fins of the radially inner range, define variable section ventilation channels and oppose axial baffles facing the centrifugal flow of the cooling current.

Such an arrangement of the fins implies that during rotation of the disc about its axis, the cooling air due to turbulent motion impacts against the walls of the fins of the radially outer range, i.e. the fins which form said axial baffles, and is conveyed around them. The cooling air flow passes through narrow passages and bottlenecks formed by the connecting fins and locally modifies the flow swirl.

In axial direction (X-X), the ventilation channel geometry is defined by the inner surfaces of said plates, i.e. the surfaces of plates which delimit said gap in axial direction. For example, document DE-102004056645 shows a ventilated braking band which comprises facing plates. In an attempt to minimize load losses, the inlet, i.e. the radially inner, portion and outflow, i.e. the radially outer, portion of the faces of the plates facing the ventilation channels and the air current which crosses them, have a flat surface, while the radially intermediate portion, interposed between said inlet and outflow portions, has an undulating surface formed by successive annular ridges and dips. Such a document shows how the amplitude of such successive annular ridges and dips decreases away from the rotation axis of the disc along the radial direction.

Such a solution allows to increase the heat exchange surface of the plates facing the cooling air flow but does not fully solve the problem of improving cooling efficiency.

The need is strongly felt to provide a braking band and disc brake solution, capable of ensuring improved cooling efficiency with the same dimension as known solutions.

The need is strongly felt to provide a ventilated braking band and disc brake solution, capable of opposing a surface of increased extension with respect to known solutions to the ventilating fluid flow, without increasing the overall dimensions of the brake disc.

The need is a strongly felt to provide a braking band and disc brake solution, capable of maximizing the heat exchange between the brake disc body and the cooling fluid current, without because of this having overall dimensions and weights incompatible with applications on high-performance vehicles.

Solution

It is an object of the present invention to solve the drawbacks of the prior art and to provide a solution to the needs described hereto with reference to the prior art.

It is an object of the present invention to suggest a solution of braking band for brake disc capable of maximizing cooling efficiency.

These and other objects are achieved by the braking band, the disc and the disc brake described in detail below.

Some advantageous embodiments are also described.

DRAWINGS

Further features and advantages of the braking band and disc will become apparent from the following description of preferred embodiments thereof, given by way of non-limiting examples, with reference to the accompanying drawings, in which.

DESCRIPTION OF SOME PREFERRED EMBODIMENTS

Figure 1:
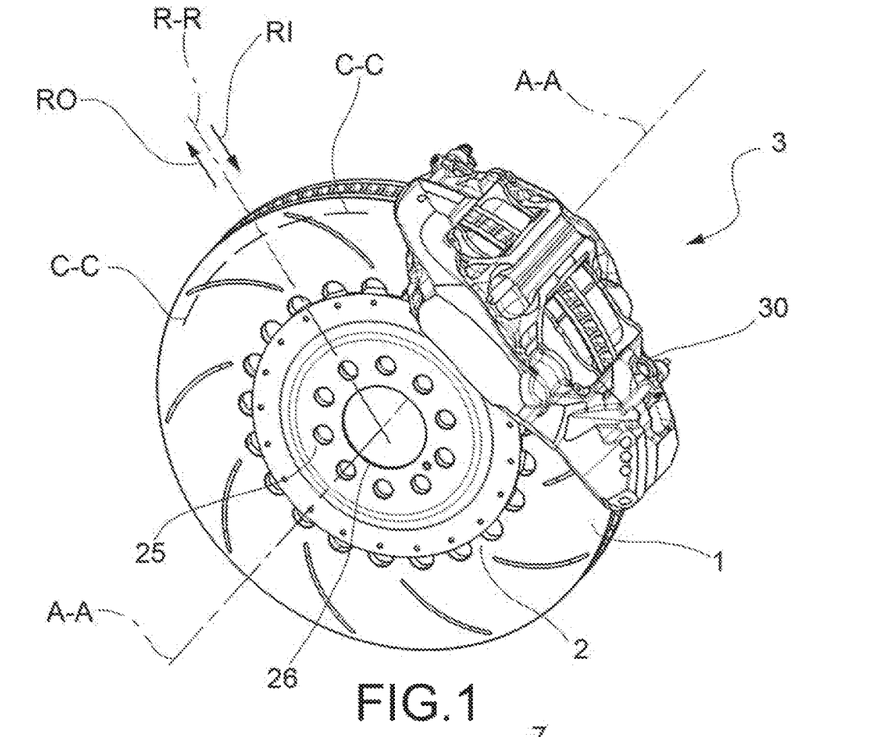
FIG. 1 is an axonometric view of a disc brake according to a further embodiment.
Figure 2:
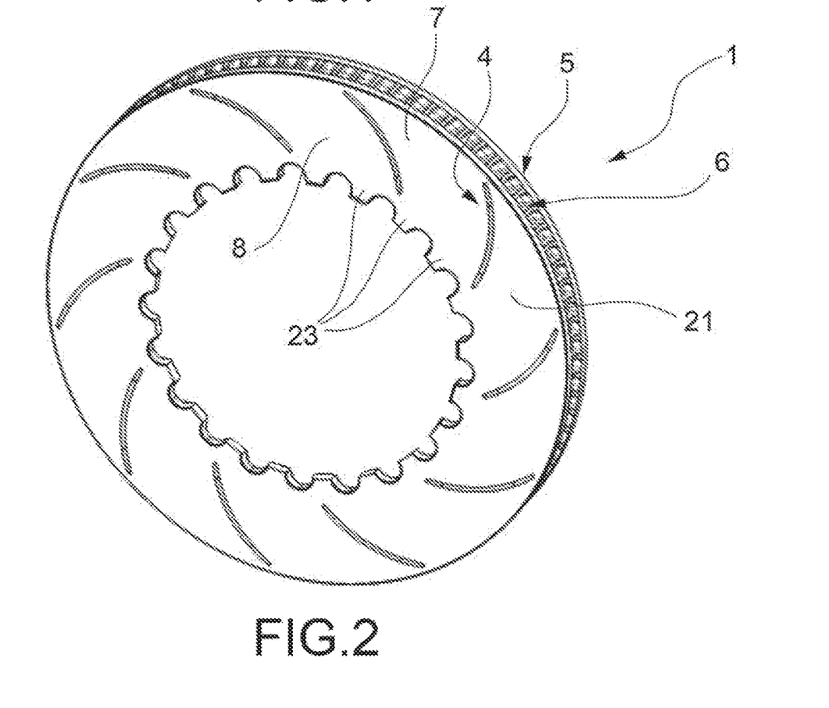
FIG. 2 is an axonometric view of a portion of a braking band, according to an embodiment.

According to a general embodiment, a braking band 1 of a disc 2 for a disc brake 3 is provided. Said disc 2 defines a rotation axis A-A, which defines an axial direction X-X, either coinciding with or parallel to said axis rotation A-A of the disc 2, a radial direction R-R, substantially orthogonal to the axial direction X-X, and a circumferential C-C or tangential C-C direction, substantially orthogonal to the axial direction X-X and to the radial direction R-R. Said disc 2 further defines a radially inner direction RI, either parallel to or coinciding with the radial direction R-R and directed in approach towards the rotation axis A-A of the disc 2, and a radially outer direction RO, opposite to said radially inner direction RI. A plurality of concentric circumferences, either parallel to or coincident with the circumferential direction C-C and passing through predefined radial coordinates all having center on the rotation axis A-A of the disc 2, are also defined in said braking band 1.

Figure 3:
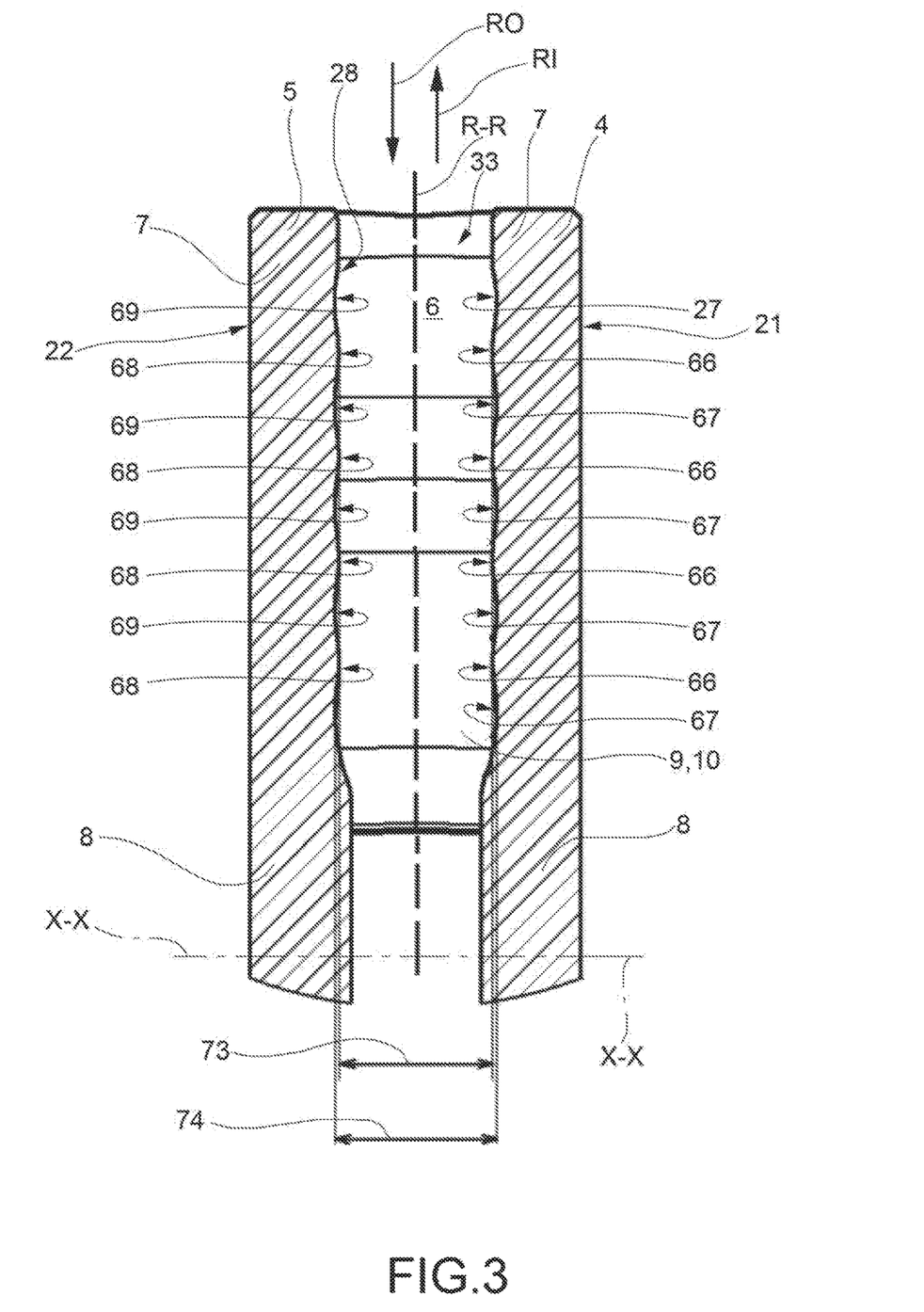
FIG. 3 is a section view of a braking band according to an embodiment, in which such a section is taken according to a cutting plane parallel to the radial direction and to the axial direction.

Said braking band 1 comprises a first plate 4 and a second plate 5, said first plate 4 is arranged facing said second plate 5 so as to form a gap 6.

Said first plate 4 comprises a first braking surface 21, adapted to face at least a first brake pad of a brake caliper 30, which can be associated with the braking band 1, and a first plate inner surface 27, opposite to said first braking surface 21 and facing said second plate 5.

Said second plate 5 comprising a second braking surface 22, opposite to said first braking surface 21 and adapted to face at least one second opposite brake pad of a brake caliper 30, which can be associated with the braking band 1, and a second plate inner surface 28, opposite to said second braking surface 22 and facing said first plate 4.

Said first braking surface 21 is substantially parallel to said second braking surface 22.

According to a preferred embodiment, said braking band 1 comprises a radially inner peripheral portion 8, facing said rotation axis A-A of the disc 2, and a radially outer peripheral portion 7, substantially coaxial with said radially inner peripheral portion 8 and facing opposite to said radially inner peripheral portion 7.

Said braking band 1 comprises a plurality of fins connecting elements/spacers which axially connect said first plate 4 and said second plate 5.

Said plurality of connecting elements/spacers comprise a plurality of connecting fins 9, 10.

Figure 9:
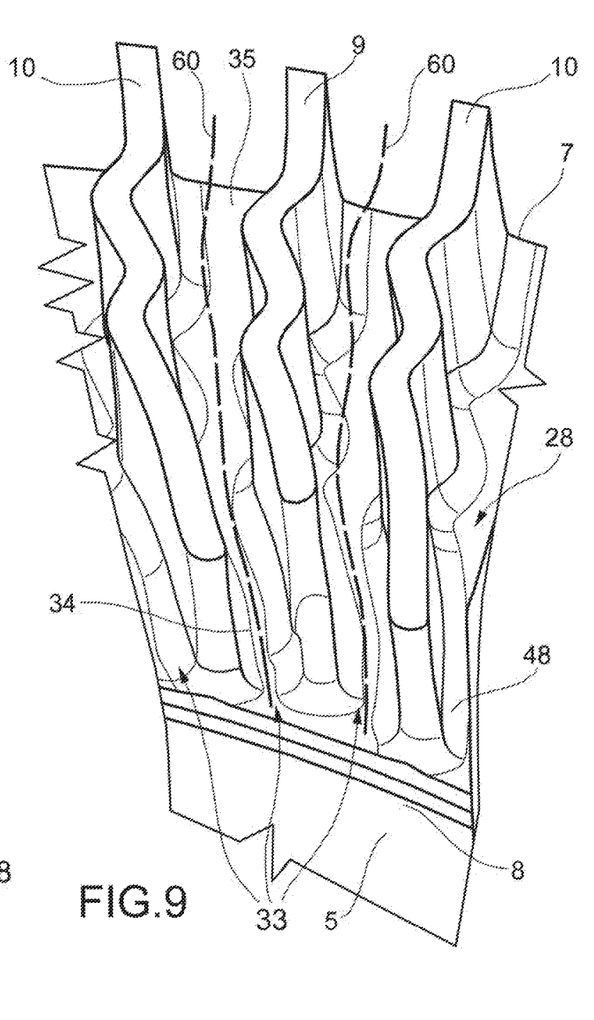
FIG. 9 is an axonometric view of a local section of a braking band which shows some connecting fins and some ventilation channels, according to an embodiment.

Each connecting fins 9, 10 extends continuously between said radially inner peripheral portion 8 and said radially outer peripheral portion 7 of the braking band 1 along a longitudinal fin direction 11, 12, which substantially coincides with the longitudinal development axis of the connecting fin 9, 10. Said plurality of connecting fins 9, 10 delimit ventilation channels 33 in said gap 6 together with said first plate 4 and said second plate 10. Preferably, said ventilation channels 33 are adapted to convey a flow of cooling fluid to extract heat from the braking band 1, when in operating conditions. Preferably, the expression "extends continuously" indicates that each connecting fin 9, 10 seamlessly extends connecting said first plate and said second plate along a longitudinal fin direction 11, 12, avoiding to delimit side or transverse openings of the ventilation channels.

Figure 7:
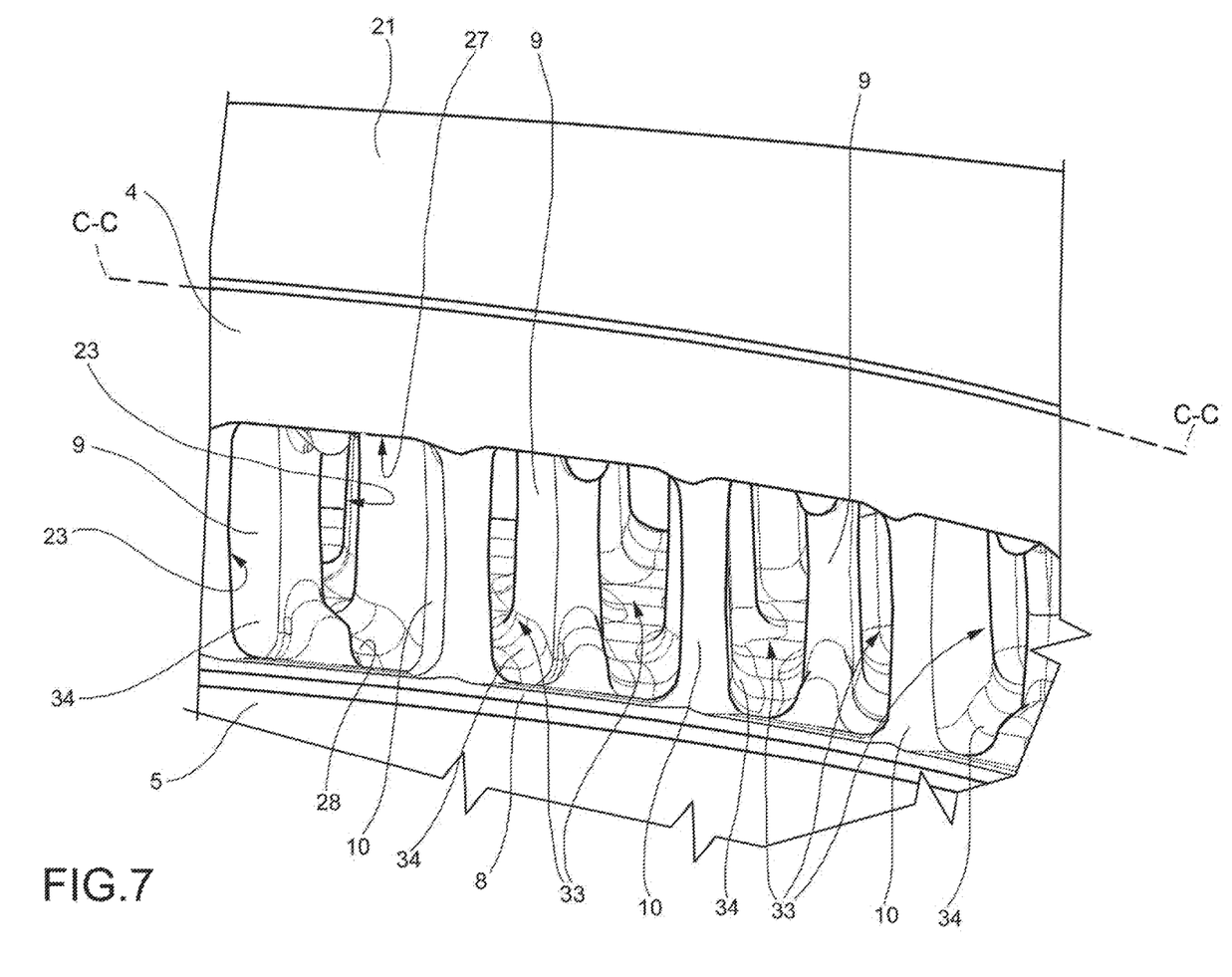
FIG. 7 is an axonometric view showing a braking band, according to an embodiment, as seen from rotation axis of the disc A-A.

At least some connecting fins 9, 10 of said plurality of connecting fins 9, 10 extend along a longitudinal fin direction 11, 12 and comprise at least one arched stretch 13, 14, 15, 16 17, 18, 19, 20, curved in circumferential direction C-C, having a concavity which is kept in the same sense along the entire longitudinal extension of the at least one arched stretch 13, 14, 15, 16, 17, 18, 19, 20 of said some connecting fins 9, 10, defining ventilation channels 33, having at least one curved wall in circumferential direction C-C. Preferably, said connecting fins 9, 10 extend to connect said radially inner peripheral portion 8 and said radially outer peripheral portion 7 of the braking band 1. According to an embodiment, said longitudinal fin direction 11, 12 is directed substantially in radial direction R-R or sub-radial direction. Preferably, said arched stretch is a circumferentially arched stretch. The word "arched" indicates a stretch of the fin which has a curvature in circumferential direction C-C in which the sense of the concavity does not change.

Said first plate inner surface 27 comprises a plurality of first plate protrusions 66 which project into said gap 6 from said first plate inner surface 27 towards said second plate 5, whereby avoiding to join said first plate 4 with said second plate 5.

Said second plate inner surface 28 comprises a plurality of second plate protrusions 68 which project into said gap 6 from said second plate inner surface 28 towards said first plate 4, whereby avoiding to connect said first plate with said second plate.

The provision of such first plate inner surface and second plate inner surface defines ventilation channels 33 having at least one wall curved also in axial direction X-X. Furthermore, it allows to increase the heat exchange surface of the plates 4, 5 facing the cooling fluid flow.

Advantageously, said at least one arched stretch 13, 14, 15, 16, 17, 18, 19, 20 of said at least some connecting fins 9, 10 extends from at least a first fin protrusion 66 of said first fin inner surface 27. In this manner, at least one ventilation channel 33, preferably a plurality of ventilation channels 33, is defined comprising at least one channel stretch having at least one wall curved in circumferential direction C-C and at least one wall curved in axial direction X-X.

The combined provision of said ventilation channels 33 having at least one arched stretch in axial direction X-X and at least one wall curved in circumferential direction C-C allows to influence the dynamics of the cooling fluid flow, whereby promoting the turbulence of the cooling fluid flow and locally generating swirls in two circumferential and axial directions, thus increasing the thermal exchange capacity between the braking band 1 and the cooling fluid flow.

According to an embodiment, all said connecting fins 9, 10 comprise at least one arched stretch 13, 14, 15, 16, 17, 18, 19, 20 which projects from first fin protrusion 66.

Figure 6:
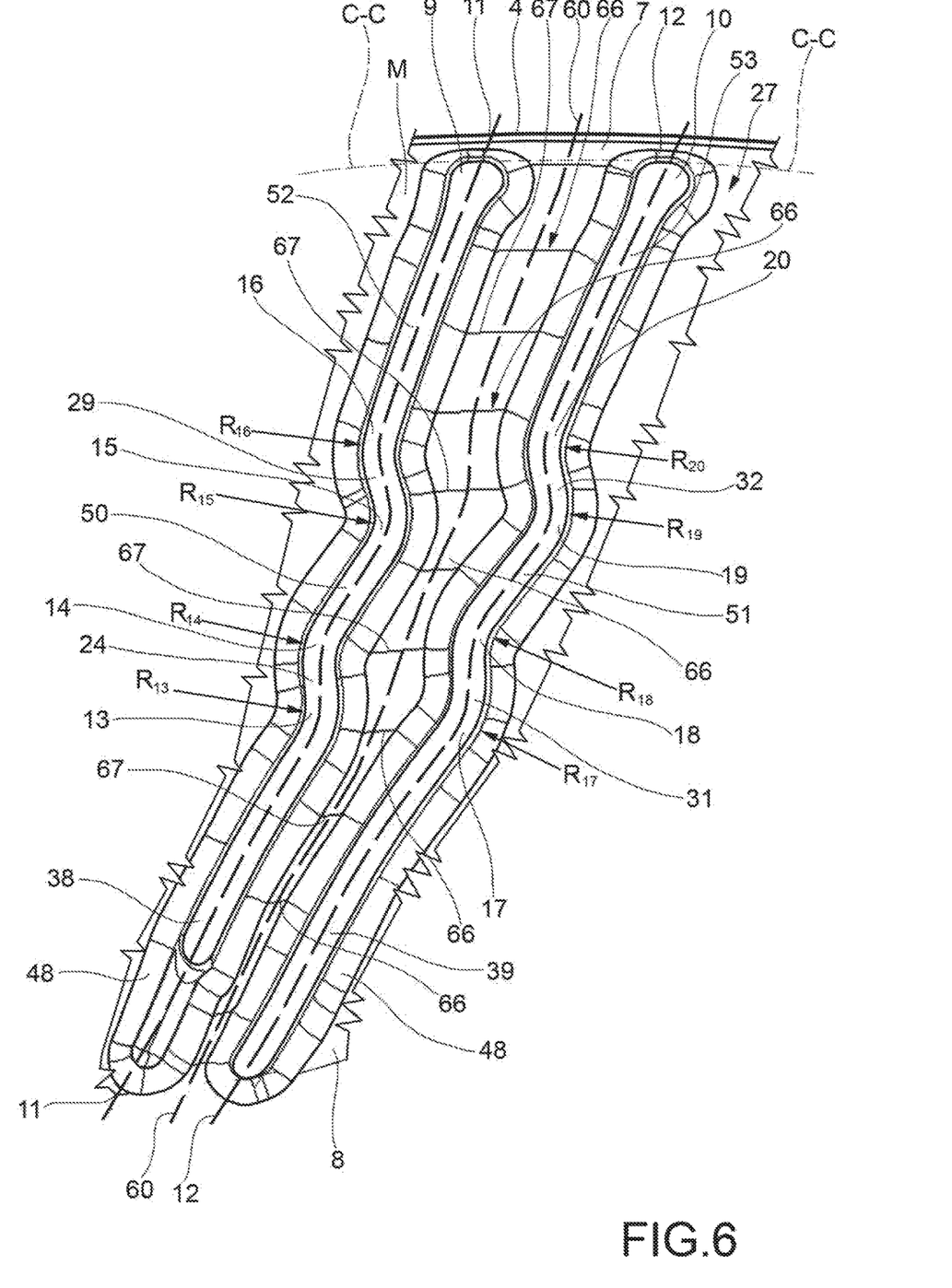
FIG. 6 is a section view of a braking band module according to an embodiment, in which such a section is taken according to a cutting plane parallel to the radial direction and to the circumferential direction.

According to an embodiment, said plurality of connecting fins 9, 10 comprise at least a first connecting fin 9 which extends along a first fin longitudinal direction 11 and at least one second connecting fin 10 extending along a second fin longitudinal direction 12. Preferably, said connecting fins 9, 10 define a module M repeated according to said circumferential direction C-C remaining coaxial with the braking band 1. According to an embodiment, said module M is in form of a segment of the braking band.

According to an embodiment, said first connecting fin 9 and said second connecting fin 10 delimit together with said first plate inner surface 27 and said second plate inner surface 28 a ventilation channel 33 which extends along a longitudinal channel direction 60 substantially coincident with the longitudinal development axis of said ventilation channel 33.

According to an embodiment, said connecting fins 9, 10 constituting said module M delimit at least one ventilation channel 33, which define a longitudinal channel direction 60 substantially coinciding with the longitudinal development axis of said ventilation channel 33. Preferably, said at least one ventilation channel 33 defines said module M together with said connecting fins 9, 10. According to an embodiment, said ventilation channel 33 includes a radially inner mouth 34 facing the rotation axis A-A, and a radially outer mouth 35, radially opposite with respect to said radially inner mouth 34. According to an embodiment, said longitudinal channel direction 60 is non-parallel to the radial direction R-R.

According to an embodiment, said first connecting fin 9 comprises at least a first fin arched stretch 13, 14, 15, 16 having a concavity which is kept in the same sense along the entire extension of the at least one arched stretch 13, 14, 15, 16 in said first fin longitudinal direction 11.

According to a preferred embodiment, said at least a first fin arched stretch 13, 14, 15, 16 defines at least one change of direction of said first fin longitudinal direction 11 with respect to the radial direction R-R.

According to an embodiment, said second connecting fin 10 comprises at least one second fin arched stretch 17, 18, 19, 20 having a concavity which is kept in the same sense along the entire extension of the at least one second fin arched stretch 17, 18, 19, 20 in said second fin longitudinal direction 12.

According to an embodiment, said at least one second fin arched stretch 17, 18, 19, 20 defines at least one change of direction of said second fin longitudinal direction 12 with respect to the radial direction R-R.

According to an embodiment, said at least a first fin arched stretch 13, 14, 15, 16 and said at least one second fin arched stretch 17, 18, 19, 20 project from the same first plate protrusion 66, forming at least one arched channel stretch in circumferential direction C-C and having at least one curved wall in axial direction X-X. In this manner, the local swirl and the cooling flow turbulence is increased, whereby improving thermal exchange efficiency. In other words, the longitudinal channel path 60 forms at least one circumferentially arched channel stretch 71, curved in circumferential direction C-C and having at least one wall curved in axial direction X-X.

According to an embodiment, at least a first plate protrusion 66 extends in continuously parallel manner to the circumferential direction C-C, whereby forming an annular protrusion which projects from said first plate inner surface 27. In other words, at least a first plate protrusion 66 extends at a predetermined radial distance from the rotation axis A-A of the disc 2, whereby forming a continuous ring.

According to an embodiment, at least one second plate protrusion 68 extends in continuously parallel manner to the circumferential direction C-C, whereby forming an annular protrusion which projects from said second plate inner surface 28. In other words, at least one second plate protrusion 68 extends at a predetermined radial distance from the rotation axis A-A of the disc 2, whereby forming a continuous ring.

According to an embodiment, said at least a first plate protrusion 66 and said at least a first second plate protrusion 68 are arranged mutually in phase, so that each first plate protrusion 66 axially and directly faces a second plate protrusion 68. In other words, said at least a first plate protrusion 66 and said at least one second plate first protrusion 68 are located at the same radial distance from the rotation axis A-A of the disc 2.

The provision of said first plate protrusions 66 and said second plate protrusions 68 mutually in phase together with the provision of said at least a first fin arched stretch 13, 14, 15, 16 and said at least one second fin arched stretch 17, 18, 19, 20 which project from the same first plate protrusion 66, form at least one arched channel stretch in circumferential direction C-C and having at least one wall curved in axial direction X-X. In this manner, the local speed of the cooling fluid flow and the turbulence of the cooling flow are increased, whereby improving thermal exchange efficiency. In this manner, the longitudinal channel path 60 forms at least one circumferentially arched channel stretch 71, curved in circumferential direction C-C and forming at least one bottleneck in axial direction X-X.

According to a preferred embodiment, said first plate 4 comprises a plurality of first plate protrusions 66, which follow one another along said radial direction R-R, wherein two adjacent first plate protrusions 66 define a first plate bottom portion 67, radially interposed between said two adjacent first plate protrusions 66. Preferably, said two adjacent first plate protrusions 66 are annular protrusions and said first plate bottom portion 67 defines an annular dip radially interposed between two adjacent annular protrusions of said first plate 4.

According to a preferred embodiment, said second plate 5 comprises a plurality of second plate protrusions 68, which follow one another along said radial direction R-R, wherein two adjacent second plate protrusions 68 define a second plate bottom portion 69, radially interposed between said two adjacent second plate protrusions 68. Preferably, said two adjacent second plate protrusions 68 are annular protrusions and said second plate bottom portion 69 defines an annular dip radially interposed between two adjacent annular protrusions of said second plate 5.

According to an embodiment, said first plate protrusions 66 and said second plate protrusions 68 are mutually in phase whereby defining a channel first axial distance 74 equal to the distance in axial direction X-X between a first plate protrusion 66 and a facing second plate protrusion 68, and a channel second axial distance 73 equal to the distance in axial direction X-X between a first plate bottom portion 67 and a facing second plate bottom portion 69, wherein said channel first axial distance 74 is smaller than said channel second axial distance 73. In this manner, axial bottlenecks can be formed in said ventilation channels 33.

According to an embodiment, said first plate protrusions each comprise a protrusion top portion. Preferably, the protrusion top portion of all of the first plate protrusions 66 is aligned with a single axial level. According to an embodiment, said second plate protrusions 68 each comprise a protrusion top portion. Preferably, the protrusion top portion of all of the second plate protrusions 68 is aligned with a single axial level. According to an embodiment, said first plate bottom portions 66 are all aligned with a single axial level. According to an embodiment, said second plate bottom portions 68 are all aligned with a single axial level.

According to an embodiment, the undulations defined by said first plate inner part 27 and said second plate inner wall 28 are substantially all of the same width.

Figure 4:
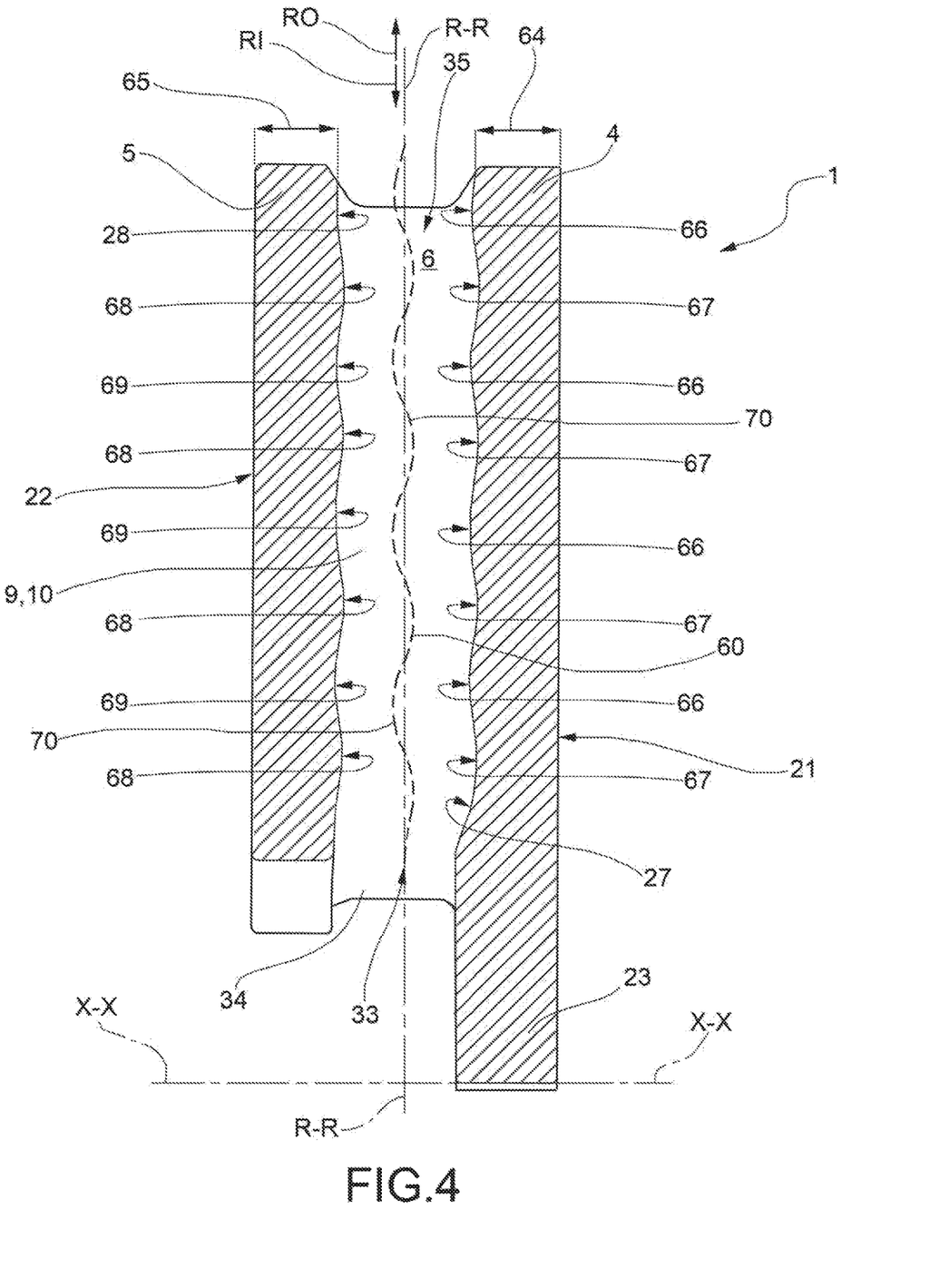
FIG. 4 is a section view of a braking band according to an embodiment, in which such a section is taken according to a cutting plane parallel to the radial direction and to the axial direction.
Figure 5:
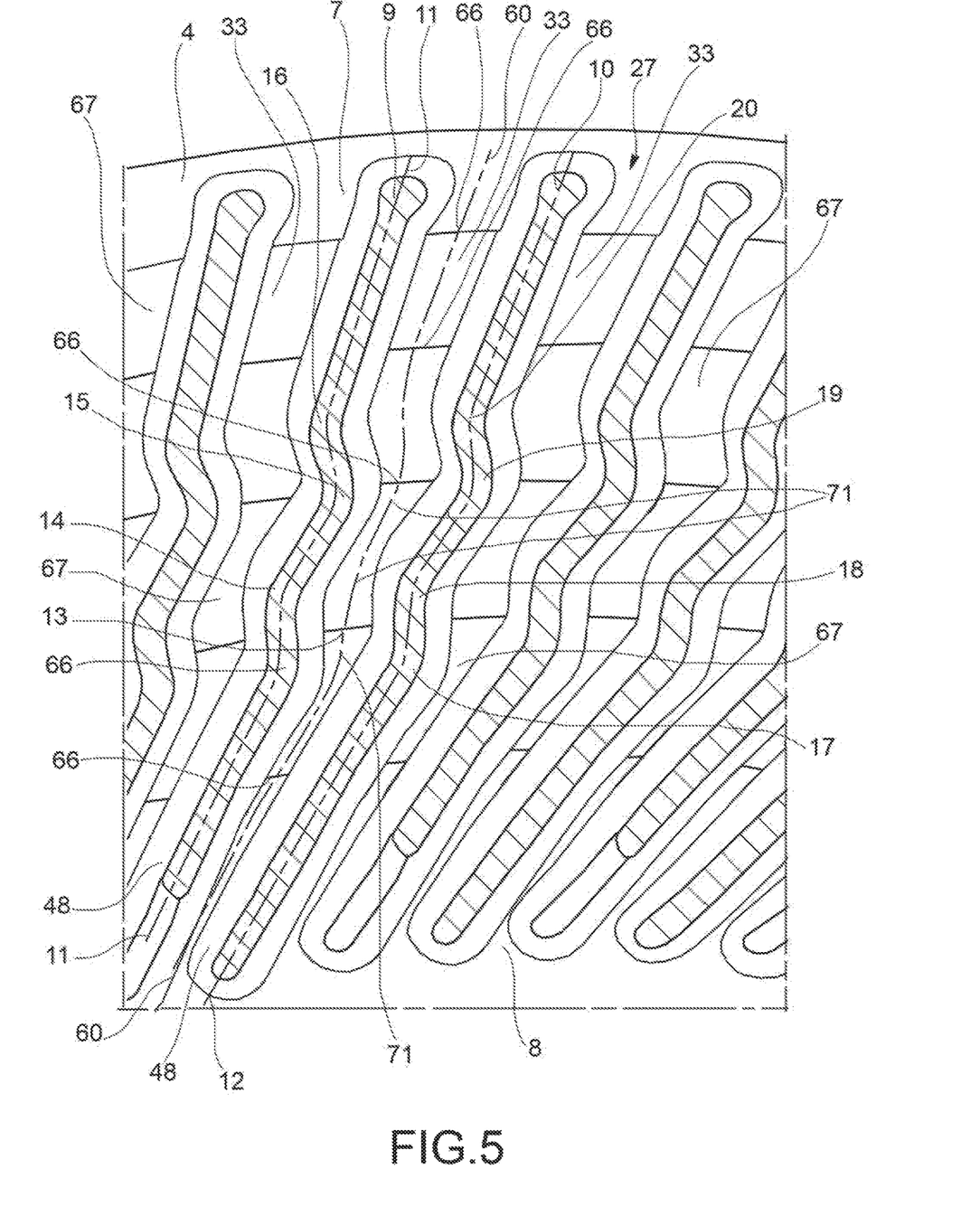
FIG. 5 is a section view of a braking band according to an embodiment, in which such a section is taken according to a cutting plane parallel to the radial direction and to the circumferential direction.

According to an embodiment, said at least a first plate protrusion 66 and said at least a first second plate protrusion 68 are arranged mutually offset, so that each first plate protrusion 66 axially and directly faces a second plate bottom portion 69. In other words, said at least a first plate protrusion 66 and said at least one second plate bottom protrusion 69 are located at the same radial distance from the rotation axis A-A of the disc 2.

The provision of said first plate protrusions 66 and said second plate protrusions 68 mutually offset together with the provision of said at least a first fin arched stretch 13, 14, 15, 16 and said at least one second fin arched stretch 17, 18, 19, 20 which project from the same first plate protrusion 66, form at least one channel stretch arched in circumferential direction C-C and arched in axial direction X-X. In this manner, the local swirl of the cooling fluid flow and the turbulence of the cooling flow are increased, whereby improving thermal exchange efficiency. In this manner, the longitudinal channel path 60 forms at least one channel stretch curved in circumferential direction C-C and in axial direction X-X. In other words, the longitudinal channel path 60 comprises a channel circumstantially arched stretch 71 and a channel axially arched stretch 70 which are mutually coinciding.

According to an embodiment, said first plate protrusions 66 and said second plate 68 protrusions are mutually offset whereby defining a channel axial distance equal to the distance in axial direction X-X between a first plate protrusion 66 and a facing second plate bottom portion 69, preferably said axial distance being substantially constant along the channel path 60.

According to an embodiment, said at least a first plate protrusion 66 and said at least one second plate protrusion 68 are arranged mutually offset, so that each second plate protrusion 68 axially and directly faces a first plate bottom portion 67. In other words, said at least one second plate protrusion 68 and said at least a first plate bottom protrusion 67 are located at the same radial distance from the rotation axis A-A of the disc 2. In this manner, the channel path 60 of said ventilation channel 33 comprises at least one axially arched stretch 70, curved in axial direction X-X.

According to an embodiment, said first plate inner surface 27 and said second plate inner surface 28 both have an undulated profile, preferably undulated in axial direction X-X, facing said gap 6.

According to an embodiment, said first plate 4 has a first plate body having a first plate thickness 64 evaluated in axial direction X-X, and said second plate 5 has a second plate body having a second plate thickness 65 evaluated in axial direction X-X.

According to an embodiment, said first plate thickness 64 is non-constant or variable along the radial direction R-R, so that said first plate inner surface 27 is in at least some of its portions non-parallel to said first braking surface 21, whereby defining a plurality of first plate protrusions 66 and a plurality of first plate bottom portions 67, in which the first plate thickness 64 of said first plate protrusions 66 is greater than the first plate thickness 64 of said first plate bottom portions 67.

According to an embodiment, said second plate thickness 65 is non-constant or variable along the radial direction R-R, so that said second plate inner surface 28 is in at least some of its portions non-parallel to said second braking surface 22, whereby defining a plurality of second plate protrusions 68 and a plurality of second plate bottom portions 69, in which the second plate thickness 65 of said second plate protrusions 68 is greater than the second plate thickness 65 in said second plate bottom portions 69.

According to an embodiment, said at least one arched stretch 13, 14, 15, 16, 17, 18, 19, 20 of said at least some connecting fins 9, 10 axially extends from a first plate protrusion 66 of said first plate inner surface 27. In other words, said at least one arched stretch 13, 14, 15, 16, 17, 18, 19, 20 of said at least some connecting fins 9, 10 extends axially from a first plate protrusion 66 of said first plate inner surface 27.

According to an embodiment, said at least one arched stretch 13, 14, 15, 16, 17, 18, 19, 20 of said at least some connecting fins 9, 10 axially extends from a second plate protrusion 67 of said second plate inner surface 28.

According to an embodiment, said at least one arched stretch 13, 14, 15, 16, 17, 18, 19, 20 axially extends from a first plate bottom portion 67.

According to an embodiment, said at least one arched stretch 13, 14, 15, 16, 17, 18, 19, 20 axially extends from a second plate bottom portion 68.

According to an embodiment, at least some connecting fins 9, 10 of said plurality of connecting fins 9, 10 each comprise at least two circumferentially arched portions 13, 14, 15, 16, 17, 18, 19, 20 having concavity in opposite sense, and a fin inflection portion 24, 29, 31, 32, 36, 37 interposed between said at least two circumferentially arched portions 13, 14, 15, 16, 17, 18, 19, 20 of said fin 9, 10. According to an embodiment, said fin inflection portion 24, 29, 31, 32, 36, 37 axially extends from a first plate protrusion 66 of said first plate inner surface 27.

According to an embodiment, said fin inflection portion 24, 29, 31, 32, 36, 37 axially extends from a second plate protrusion 68 of said second plate inner surface 28.

According to an embodiment, said at least one fin inflection portion 24, 29, 31, 32, 36, 37 extends axially from a first plate bottom portion 67 of said first plate inner surface 27.

According to an embodiment, said at least one fin inflection portion 24, 29, 31, 32, 36, 37 axially extends from a second plate 68 bottom portion 69 of said second plate inner surface 28.

According to an embodiment, said braking band 1 is made of cast iron.

According to an embodiment, said braking band 1 is made of composite material.

According to an embodiment, a predetermined angle defining the pitch of the modules or pitch of connecting tabs 9, 10 is provided between one module and the next. By providing said pitch of the modules, each of said segments formed by each module M avoids describing a vertex on the rotation axis A-A of the disc.

According to an embodiment, either said first fin 9 or said second fin 10 has a shorter length than the other. According to an embodiment, the extension of said first fin 9 along said longitudinal direction of the first fin 11 is smaller than the extension of said second fin 10 in said longitudinal extension of the second fin 12.

According to an embodiment, said first fin 9 extends between said radially inner peripheral portion 8 and said radially outer peripheral portion 7 according to said longitudinal fin direction 11, whereby forming an arched first fin first arched stretch 13. In accordance with an embodiment, said second fin 10 develops according to a second longitudinal direction 12 between said peripheral stretch radially inner body 8 and said peripheral stretch radially outer stretch 7 forming an arched first arched stretch of second fin 17.

According to an embodiment, said first fin first stretch 13 has a first concavity R13 which is kept in the same sense along the entire extension of the first fin arched first stretch 13 in said first longitudinal direction 11.

According to an embodiment, said first fin 9 extends according to said first longitudinal direction 11 also forming an arched first fin second arched stretch 14.

According to an embodiment, said first fin second arched stretch 14 has a second concavity R14 which is kept in the same direction along the entire extension of the first fin second arched stretch 14 in said first fin longitudinal direction 11.

According to an embodiment, said second concavity R14 has the opposite sense with respect to said first concavity R13. In this manner, said first fin first arched stretch 13 and said first fin second arched stretch 14 describe an "S"-shaped profile on a plane parallel to the braking surfaces 21, 22 of the disc 2 and which crosses said gap 6.

According to an embodiment, said first fin 9 comprises a first fin first inflection stretch 24 which is interposed between said first fin first arched stretch 13 and said first fin second arched stretch 14.

According to an embodiment, said first fin 9 extends according to said first fin longitudinal direction 11 also forming a first fin third arched stretch 15.

According to an embodiment, said first fin third arched stretch 15 has a third concavity R15 which is kept in the same direction along the entire extension of the first fin third arched stretch 15 in said first fin longitudinal direction 11.

According to an embodiment, said first fin 9 extends according to said first fin longitudinal direction 11 further forming an arched first fin fourth arched stretch 16.

According to an embodiment, said first fin fourth arched stretch 16 has a third concavity R16 which is kept in the same direction along the entire extension of the first fin third arched stretch 16 in said first fin longitudinal direction 11.

According to an embodiment, said fourth concavity R16 has opposite sense with respect to said third concavity R15. In this manner, said first fin third arched stretch 15 and said first fin fourth arched stretch 16 describe an "S"-shaped profile on a plane parallel to the braking surfaces 21, 22 of the disc 2 and which crosses said gap 6.

The combined provision of said first fin first arched stretch 13, said first fin second arched stretch 14, said first fin third arched stretch 15 and said first fin fourth arched stretch 16 allows said first fin 9 to describe a "double-S"-shaped profile on a plane parallel to the braking surfaces 21, 22 of the disc 2 and that crosses said gap 6.

According to an embodiment, said first fin 9 comprises a first fin second inflection stretch 29 interposed between said first fin third arched stretch 15 and said first fin second arched stretch 16.

According to an embodiment, said first fin first arched stretch 13 is located radially internally with respect to said first fin second arched stretch 14. According to an embodiment, said first fin third arched stretch 15 is located radially internally with respect to said first fin fourth arched stretch 16. Preferably, said first fin third stretch 15 is located radially externally with respect to said first fin second stretch 14.

According to an embodiment, the sense of said first concavity R13 agrees with said third concavity R15 and the sense of said second concavity R14 agrees with said fourth concavity R16.

According to an embodiment, said first fin 9 further comprises a first fin third inflection stretch 36 interposed between said first fin second arched stretch 14 and said first fin third arched stretch 15. Preferably, a substantially rectilinear first fin intermediate stretch 50 comprising said first fin third inflection stretch 36 is interposed between said first fin second arched stretch 14 and said first fin third arched stretch 15.

According to an embodiment, said second fin first arched stretch 17 has a fifth concavity R17 which is kept in the same direction along the entire extension of the second fin first arched stretch 17 in said second fin longitudinal direction 12.

According to an embodiment, said second fin 10 extends according to said second fin longitudinal direction 12 further forming a second fin second arched stretch 18.

According to an embodiment, said second fin second arched stretch 18 has a sixth concavity R18 which is kept in the same direction along the entire extension of the second fin second arched stretch 18 in said second fin longitudinal direction 12.

According to an embodiment, said sixth concavity R18 has the opposite sense with respect to said seventh concavity R17. In this manner, said second fin first arched stretch 17 and said second fin second arched stretch 18 describe an "S"-shaped profile on a plane parallel to the braking surfaces 21, 22 of the disc 2 and which crosses said gap 6.

In accordance with an embodiment, said second fin 10 comprises a second fin first inflection stretch 31 which is interposed between said second fin first arched stretch 17 and said second fin second arched stretch 18.

According to an embodiment, said second fin 10 extends according to said second fin longitudinal direction 12 further forming a second fin third arched stretch 19.

According to an embodiment, said second fin third arched stretch 19 has a seventh concavity R19 which is kept in the same direction along the entire extension of the second fin third arched stretch 18 in said second fin longitudinal direction 12.

According to an embodiment, said second fin 10 extends according to said second fin longitudinal direction 12 further forming a second fin fourth arched stretch 20.

According to an embodiment, said second fin fourth arched stretch 20 has an eighth concavity R20 which is kept in the same direction along the entire extension of the second fin third arched stretch 20 in said second fin longitudinal direction 12.

According to an embodiment, said eighth concavity R20 has opposite sense with respect to said seventh concavity R19. In this manner, said second fin third arched stretch 19 and said second fin fourth arched stretch 20 describe an "S"-shaped profile on a plane parallel to the braking surfaces 21, 22 of the disc 2 and which crosses said gap 6.

According to an embodiment, said second fin 10 comprises a second fin second inflection stretch 32 which is interposed between said second fin third arched stretch 19 and said second fin fourth arched stretch 20.

According to an embodiment, said first fin first arched stretch 17 is located radially internally with respect to said second fin second arched stretch 18. According to an embodiment, said second fin third arched stretch 19 is located radially internally with respect to said second fin fourth arched stretch 20. Preferably, said second fin third arched stretch 19 is located radially externally with respect to said second fin second arched stretch 18.

The combined provision of said second fin first arched stretch 17, said second fin second arched stretch 18, said second fin third arched stretch 19 and said second fin fourth arched stretch 20 allows said second fin 10 to describe a "double-S"-shaped profile on a plane parallel to the braking surfaces 21, 22 of the disc 2 and that crosses said gap 6.

According to an embodiment, the sense of said fifth concavity R17 agrees with said seventh concavity R19 and the sense of said sixth concavity R18 agrees with said eighth concavity R20.

According to an embodiment, said second fin 10 further comprises a second fin third inflection stretch 37 which is interposed between said second fin second arched stretch 18 and said second fin third arched stretch 19. According to an embodiment, a second fin intermediate stretch 18 comprising said second fin third inflection stretch 19 is interposed between said second fin second arched stretch 51 and said second fin third arched stretch 37. According to an embodiment, said second fin intermediate stretch 51 has a second fin intermediate stretch concavity. According to an embodiment, said second fin intermediate stretch 51 is substantially rectilinear.

According to an embodiment, said first plate inner surface 27 comprises a plurality of first plate protrusions 66 which are annular and concentric and coaxial with the rotation axis A-A of the disc and a plurality of first plate bottom portions 67 which are annular and concentric coaxial with the rotation axis A-A of the disc.

According to an embodiment, said second plate inner surface 28 comprises a plurality of second plate protrusions 68 which are annular and concentric and coaxial with the rotation axis A-A of the disc and a plurality of second plate bottom portions 69 which are annular and concentric coaxial with the rotation axis A-A of the disc.

According to an embodiment, said first plate inner surface 27 comprises at least four first plate protrusions 66 which are annular and concentric coaxial with the rotation axis A-A of the disc.

Preferably, said first plate protrusions 66 project from said first plate inner surface 27 for the entire extension in radial direction R-R of said first plate inner surface 27. Preferably, said second plate protrusions 67 project from said second plate inner surface 28 for the entire extension in radial direction R-R of said second plate inner surface 28.

According to an embodiment, said first fin radially inner stretch 38 and said second fin radially inner stretch 39 both project from a same first plate protrusion 66, preferably from a same first plate annular protrusion.

According to an embodiment, said first fin first arched stretch 13 and said second fin first arched stretch 17 both project from a same first fin bottom portion 67, preferably from a same first plate bottom annular portion.

According to an embodiment, said first fin first inflection portion 24 and said second fin first inflection portion 31 both project from a same first plate protrusion 66, preferably from a same first plate annular protrusion.

According to an embodiment, said first fin second arched stretch 14 and said second fin second arched stretch 18 both project from a same first fin bottom portion 67, preferably from a same first plate bottom annular portion.

According to an embodiment, said first fin third arched stretch 15 and said second fin third arched stretch 19 both project from a same first plate protrusion 66, preferably from a same first plate annular protrusion.

According to an embodiment, said first fin fourth arched stretch 16 and said second fin fourth arched stretch 20 both project from a same first plate bottom portion 67, preferably from a same first plate annular portion.

According to an embodiment, said first fin radially outer stretch 52 and said second fin radially outer stretch 53 both project from a same first plate protrusion 66, preferably from a same first plate annular protrusion.

According to an embodiment, said second plate inner surface 28 comprises at least four second plate protrusions 68 which are annular and concentric coaxial with the rotation axis A-A of the disc.

Figure 8:
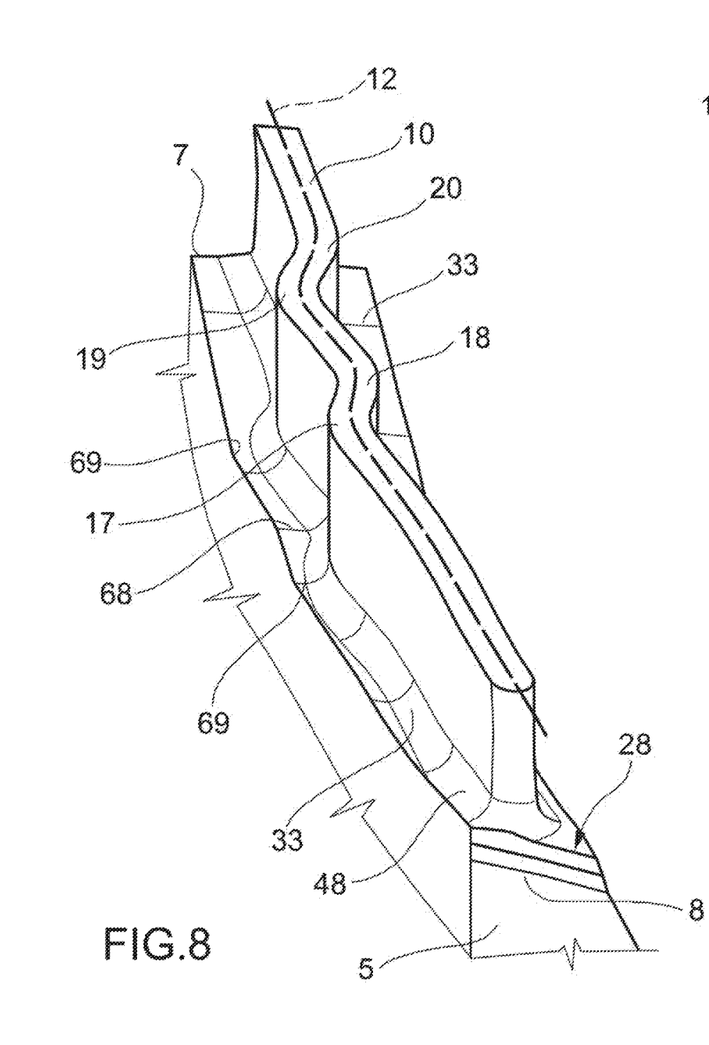
FIG. 8 is an axonometric view of a local section of a braking band which shows a connecting fin, according to an embodiment.

According to an embodiment, at least some of the connecting fins 9, 10 also comprise a joining foot 48 to form a curved joining and connecting surface between the inner surface 27, 28 of at least either said first plate 4 or said second plate 5 and the fin portion facing the ventilation channel 33.

According to an embodiment, said first fin 9 comprises a first fin radially inner stretch 38 which extends axially internally with respect to said first fin first circumferentially arched stretch 15. Preferably, said first fin radially inner stretch 38 has a concavity of opposite sense with respect to said first concavity R13 of said first fin first stretch 13. According to an embodiment, said second fin radially inner stretch 38 is substantially rectilinear. Preferably, said longitudinal tongue extends radially internally from said first fin radially inner stretch 38.

According to an embodiment, said first fin 10 comprises a second fin radially inner stretch 39 which extends axially internally with respect to said second fin first arched stretch 17. Preferably, said second fin radially inner stretch 39 has an opposite sense concavity with respect to said fifth concavity R17 of said second fin first stretch 17. According to an embodiment, said second fin radially inner stretch 39 is substantially rectilinear.

According to an embodiment, said first fin radially inner stretch 38 and said second fin radially inner stretch 39 diverge in radially outer direction RO.

According to a general embodiment, a disc 2 for disc brake 3 is provided comprising a braking band 1, according to any one of the embodiments described previously, and a disc bell 25.

According to an embodiment, said disc 2 further comprises a disc bell 25, intended to be connected to a wheel hub of an associable vehicle. Preferably, said disc bell 25 comprises a connection portion to the hub 26, adapted to connect either directly or indirectly to the wheel hub of an associable vehicle. Preferably, said braking band 1 and said disc bell 25 are mutually coaxial.

According to an embodiment, at least one of either said first plate 4 and said second plate 5, preferably said second plate 5, comprises a plurality of feeding teeth 23 which protrude in radially inner direction RI from the radially inner edge 8 of the said second plate 5, said feeding teeth 23 forming the connection to the disc bell 25 to transfer in circumferential direction C-C the braking action of the braking band 1 to the disc bell 25.

According to a general embodiment, a disc brake 3 comprises at least one braking band 1 according to any one of the embodiments described above, at least one disc bell 25 and at least one brake caliper 30 positioned straddling the outer peripheral margin of said disc 2.

By virtue of the features described above, provided either separately or in combination, it is possible to provide a solution to the aforesaid often conflicting needs and to obtain the aforesaid advantages, in particular:

- an improved cooling efficiency of the braking band 1 and of the disc 2 is allowed with respect to known solutions;
- ventilation channels are made having a curved path both in circumferential direction and in axial direction, whereby optimizing the ventilation flow turbulence;
- at the same time, swirls can be generated in the cooling flow fluid in directions which are substantially orthogonal to one another;
- the motion of the cooling air is forced to swirl, whereby improving the heat exchange coefficient with the braking band and increasing the cooling air flow;
- mechanical and thermo-mechanical stresses on braking surfaces of the braking band are reduced;
- where applicable, mechanical and thermo-mechanical stresses on feeding teeth 23 or other means for transferring the braking action of the braking band 1 to the disc bell 25 in circumferential direction C-C are reduced;
- disc duration is increased in terms of vehicle mileage, particularly for applications on high-performance vehicles, such as for example race cars;
- the heat exchange surface can be significantly increased between the braking band and the cooling fluid;
- at the same time, the need to increase overall dimensions and/or weights of the braking band is avoided.

Those skilled in the art may make many changes and adaptations to the embodiments described above or may replace elements with others which are functionally equivalent in order to meet contingent needs without however departing from the scope of the appended claims.

LIST OF REFERENCE SYMBOLS 1 braking band
2 disc
3 disc brake
4 first plate
5 second plate
6 gap
7 radially outer peripheral portion
8 radially inner peripheral portion
9 first fin
10 second fin
11 longitudinal first fin direction
12 longitudinal second fin direction
13 first fin first arched stretch
14 first fin second arched stretch
15 first fin third arched stretch
16 first fin fourth arched stretch
17 second fin first arched stretch
18 second fin second arched stretch
19 second fin third arched stretch
20 second fin fourth arched stretch
21 first braking surface
22 second braking surface
23 feeding teeth
24 first fin first inflection portion
25 disc bell
26 connecting portion to the hub
27 first plate inner surface
28 second plate inner surface
29 first fin second inflection portion
30 brake caliper
31 second fin first inflection portion
32 second fin second inflection portion
33 ventilation channel
34 radially inner mouth
35 radially outer mouth
36 first fin third inflection portion
37 second fin third inflection portion
38 first fin radially inner stretch
39 second fin radially inner stretch
48 fin connecting foot
50 first fin intermediate stretch
51 second fin intermediate stretch
52 first fin radially outer stretch
53 second fin radially outer stretch
60 longitudinal channel direction
64 first plate thickness
65 second plate thickness
66 first plate protrusion
67 first plate bottom portion
68 second plate protrusion
69 second plate bottom portion
70 channel axially curved stretch
71 channel circumferentially curved stretch
73 first axial distance
74 second axial distance
M module
A-A disc rotation axis
X-X axial direction
R-R radial direction
C-C circumferential direction
RI inner radial direction
RO outer radial direction
R13 first concavity
R14 second concavity
R15 third concavity
R16 fourth concavity
R17 fifth concavity
R18 sixth concavity
R19 seventh concavity
R20 eighth concavity

The invention claimed is:

1. A braking band of a disc for disc brake, said disc defining a rotation axis (A-A), which defines an axial direction (X-X) either coinciding with or parallel to said rotation axis (A-A) of the disc, a radial direction (R-R) substantially orthogonal to the axial direction (X-X), and a circumferential (C-C) or tangential (C-C) direction, substantially orthogonal to the axial direction (X-X) and to the radial direction (R-R);
   said braking band comprising a first plate and a second plate, arranged mutually facing each other so as to form a gap;
   said first plate comprising a first braking surface, adapted to face at least one first brake pad of a brake caliper, configured to be associated with the braking band, and a first plate inner surface, opposite to said first braking surface and facing said second plate;
   said second plate comprising a second braking surface, opposite to said first braking surface and adapted to face at least one second opposite brake pad of a brake caliper, configured to be associated with the braking band, and a second plate inner surface, opposite to said second braking surface and facing said first plate;
   said first braking surface being substantially parallel to said second braking surface;
   wherein:
   said braking band comprises a radially inner peripheral portion, facing said rotation axis (A-A) of the disc, and a radially outer peripheral portion, substantially coaxial with said radially inner peripheral portion and facing opposite to said radially inner peripheral portion;
   said braking band further comprises a plurality of connecting elements and/or spacers axially connecting said first plate and said second plate;
   said plurality of connecting elements and/or spacers comprising a plurality of connecting fins, each connecting fin of said plurality of connecting fins extending continuously between said radially inner peripheral portion and said radially outer peripheral portion of the braking band along a longitudinal fin direction, which coincides with a longitudinal development axis of the connecting fin;
   said plurality of connecting fins delimiting, together with said first plate and said second plate, ventilation channels in said gap, said ventilation channels being adapted to convey a flow of cooling fluid to extract heat from the braking band, when in operating conditions;
   at least some connecting fins of said plurality of connecting fins extending along a longitudinal fin direction and comprising at least one arched stretch, wherein said at least one arched stretch develops along an arched stretch longitudinal extension, wherein said at least one arched stretch has a concavity kept in the same sense along the entire arched stretch longitudinal extension, defining ventilation channels, each ventilation channel having at least one wall curved in circumferential direction (C-C); and wherein
   said first plate inner surface comprises at least one first plate protrusion projecting into said gap from said first plate inner surface towards said second plate, avoiding to join with said second plate;
   said second plate inner surface comprises at least one second plate protrusion projecting into said gap from said second plate inner surface towards said first plate, avoiding to join with said first plate;
   said plurality of connecting fins comprises at least one first connecting fin which extends along a first fin longitudinal direction and at least one second connecting fin extending along a second fin longitudinal direction, wherein
   said at least one first connecting fin comprises at least one first fin arched stretch having a concavity kept in the same sense along the entire extension of the at least one first fin arched stretch in said first fin longitudinal direction, and
   said at least one second connecting fin comprises at least one second fin arched stretch having a concavity kept in the same sense along the entire extension of the at least one second fin arched stretch in said second fin longitudinal direction,
   said first fin extends according to said first fin longitudinal direction also forming an arched first fin further arched stretch, said first fin further arched stretch has a further concavity which is kept in the same direction along the entire extension of the first fin further arched stretch in said first fin longitudinal direction, said further concavity has the opposite sense with respect to said at least one concavity, so as said first fin one arched stretch and said first fin further arched stretch describe an "S" shaped profile on a plane parallel to the braking surface of the disc and which crosses said gap;
   said at least one first fin arched stretch and said at least one second fin arched stretch project from the same first plate protrusion forming at least one arched channel stretch in circumferential direction and having at least one curved wall in axial direction.

2. The braking band of claim 1, wherein said second fin extends according to said second fin longitudinal direction further forming a second fin second arched stretch,
   wherein said second fin second arched stretch has a sixth concavity which is kept in the same direction along the entire extension of the second fin second arched stretch in said second fin longitudinal direction,
   wherein said sixth concavity has the opposite sense with respect to said seventh concavity In this manner, said second fin first arched stretch and said second fin second arched stretch describe an "S"-shaped profile on a plane parallel to the braking surfaces of the disc and which crosses said gap.

3. The braking band of claim 2, wherein said second fin extends according to said second fin longitudinal direction further forming a second fin third arched stretch, wherein
   said second fin third arched stretch has a seventh concavity which is kept in the same direction along the entire extension of the second fin third arched stretch in said second fin longitudinal direction,
   wherein said second fin extends according to said second fin longitudinal direction further forming a second fin fourth arched stretch,
   wherein said second fin fourth arched stretch has an eighth concavity which is kept in the same direction along the entire extension of the second fin third arched stretch in said second fin longitudinal direction,
   said eighth concavity has opposite sense with respect to said seventh concavity, in this manner, said second fin third arched stretch and said second fin fourth arched stretch describe an "S"-shaped profile on a plane parallel to the braking surfaces of the disc and which crosses said gap.

4. The braking band of claim 2,
   wherein said first plate comprises a plurality of first plate protrusions, which follow one another along said radial direction R-R, wherein two adjacent first plate protrusions define a first plate bottom portion, radially interposed between said two adjacent first plate protrusions,
wherein said first fin second arched stretch and said second fin second arched stretch both project from a same first fin bottom portion.

5. The braking band of claim 1, wherein said first fin extends according to said first fin longitudinal direction also forming a first fin third arched stretch,
wherein said first fin third arched stretch has a third concavity which is kept in the same direction along the entire extension of the first fin third arched stretch in said first fin longitudinal direction,
and/or wherein
wherein said first fin extends according to said first fin longitudinal direction further forming an arched first fin fourth arched stretch,
wherein said first fin fourth arched stretch has a third concavity which is kept in the same direction along the entire extension of the first fin third arched stretch in said first fin longitudinal direction,
wherein said fourth concavity has opposite sense with respect to said third concavity, in this manner, said first fin third arched stretch and said first fin fourth arched stretch describe an "S"-shaped profile on a plane parallel to the braking surfaces of the disc and which crosses said gap.

6. The braking band of claim 5, wherein the combined provision of said first fin first arched stretch, said first fin second arched stretch, said first fin third arched stretch and said first fin fourth arched stretch allows said first fin to describe a "double-S"-shaped profile on a plane parallel to the braking surfaces of the disc and that crosses said gap.

7. The braking band of claim 1, wherein
said at least one arched stretch of said at least some connecting fins of said plurality of connecting fins defines ventilation channels having at least one wall curved in circumferential direction (C-C),
said at least one arched stretch of said at least some connecting fins of said plurality of connecting fins extends from the at least one first plate protrusion or the at least one second plate protrusion of said first plate inner surface or second plate inner surface, defining ventilation channels having at least one wall also curved in axial direction (X-X).

8. The braking band of claim 1, wherein said first plate inner surface and said second plate inner surface both have an undulated profile facing said gap.

9. The braking band of claim 1, wherein said first plate comprises a plurality of first plate protrusions, which follow one another along said radial direction (R-R), wherein two adjacent first plate protrusions define a first plate bottom portion, radially interposed between said two adjacent first plate protrusions.

10. The braking band of claim 1, wherein said second plate comprises a plurality of second plate protrusions which follow one another along said radial direction (R-R), wherein two adjacent second plate protrusions define a second plate bottom portion, radially interposed between said two adjacent second plate protrusions.

11. The braking band of claim 1, wherein said at least one first plate protrusion extends continuously parallel to the circumferential direction (C-C) forming an annular protrusion which projects from said first plate inner surface.

12. The braking band of claim 1, wherein said at least one second plate protrusion extends continuously parallel to the circumferential direction (C-C), forming an annular protrusion which projects from said second plate inner surface.

13. The braking band of claim 1, wherein said at least one first plate protrusion and said at least one second plate protrusion are arranged mutually in phase, so that each first plate protrusion axially and directly faces a second plate protrusion.

14. The braking band of claim 1, wherein said at least one first plate protrusion and said at least one second plate protrusion are arranged mutually offset, so that each first plate protrusion axially and directly faces a second plate bottom portion.

15. The braking band of claim 1, wherein said braking band is made of cast iron or composite material.

16. The braking band of claim 1, wherein each connecting fin seamlessly extends connecting said first plate and said second plate along a longitudinal fin direction, avoiding to delimit side or transverse openings of the ventilation channels.

17. A disc for disc brake, said disc defining a rotation axis (A-A), which defines an axial direction (X-X) either coinciding with or parallel to said rotation axis (A-A) of the disc, a radial direction (R-R) substantially orthogonal to the axial direction (X-X), and a circumferential (C-C) or tangential (C-C) direction, substantially orthogonal to the axial direction (X-X) and to the radial direction (R-R), said disc comprising a braking band which comprises a first plate and a second plate, arranged mutually facing each other so as to form a gap, said first plate comprising a first braking surface, adapted to face at least one first brake pad of a brake caliper, configured to be associated with the braking band, and a first plate inner surface, opposite to said first braking surface and facing said second plate, said second plate comprising a second braking surface, opposite to said first braking surface and adapted to face at least one second opposite brake pad of a brake caliper, configured to be associated with the braking band, and a second plate inner surface, opposite to said second braking surface and facing said first plate, said first braking surface being substantially parallel to said second braking surface, wherein:
said braking band comprises a radially inner peripheral portion, facing said rotation axis (A-A) of the disc, and a radially outer peripheral portion, substantially coaxial with said radially inner peripheral portion and facing opposite to said radially inner peripheral portion,
said braking band further comprises a plurality of connecting elements and/or spacers axially connecting said first plate and said second plate,
said plurality of connecting elements and/or spacers comprising a plurality of connecting fins, each connecting fin of said plurality of connecting fins extending continuously between said radially inner peripheral portion and said radially outer peripheral portion of the braking band along a longitudinal fin direction, which coincides with a longitudinal development axis of the connecting fin,
said plurality of connecting fins delimiting, together with said first plate and said second plate, ventilation channels in said gap, said ventilation channels being adapted to convey a flow of cooling fluid to extract heat from the braking band, when in operating conditions,
at least some connecting fins of said plurality of connecting fins extending along a longitudinal fin direction and comprising at least one arched stretch having a concavity kept in the same sense along an entire longitudinal extension of the at least one arched stretch of said at least some connecting fins, defining ventilation channels, each ventilation channel having at least one wall curved in circumferential direction (C-C), and wherein said first plate inner surface comprises at least one first plate protrusion projecting into said gap from said first plate inner surface towards said second plate, avoiding to join with said second plate, said second plate inner surface comprises at least one second plate protrusion projecting into said gap from said second plate inner surface towards said first plate, avoiding to join with said first plate, said plurality of connecting fins comprises at least one first connecting fin which extends along a first fin longitudinal direction and at least one second connecting fin extending along a second fin longitudinal direction, wherein said at least one first connecting fin comprises at least one first fin arched stretch having a concavity kept in the same sense along the entire extension of the at least one first fin arched stretch in said first fin longitudinal direction, and said at least one second connecting fin comprises at least one second fin arched stretch having a concavity kept in the same sense along the entire extension of the at least one second fin arched stretch in said second fin longitudinal direction, said first fin extends according to said first fin longitudinal direction also forming an arched first fin further arched stretch, said first fin further arched stretch has a further concavity which is kept in the same direction along the entire extension of the first fin further arched stretch in said first fin longitudinal direction, said further concavity has the opposite sense with respect to said at least one concavity, so as said first fin one arched stretch and said first fin further arched stretch describe an "S" shaped profile on a plane parallel to the braking surface of the disc and which crosses said gap;

said at least one first fin arched stretch and said at least one second fin arched stretch project from the same first plate protrusion forming at least one arched channel stretch in circumferential direction and having at least one curved wall in axial direction.

18. A disc brake comprising at least one disc according to claim 17.

* * * * *